United States Patent
Ruda

(10) Patent No.: US 7,017,515 B1
(45) Date of Patent: Mar. 28, 2006

(54) GRAPHICAL USER INTERFACE AND METHOD RELATED THERETO

(75) Inventor: Fredrik Ruda, Tumba (SE)

(73) Assignee: Delaval Holding AB, Tumba (SE)

( * ) Notice: Subject to any disclaimer, the term of this patent is extended or adjusted under 35 U.S.C. 154(b) by 70 days.

(21) Appl. No.: 10/070,401

(22) PCT Filed: Aug. 31, 2000

(86) PCT No.: PCT/SE00/01674

§ 371 (c)(1),
(2), (4) Date: Mar. 1, 2002

(87) PCT Pub. No.: WO01/17336

PCT Pub. Date: Mar. 15, 2001

(30) Foreign Application Priority Data

Sep. 3, 1999 (SE) .................................. 9903112

(51) Int. Cl.
*A01J 5/00* (2006.01)
(52) U.S. Cl. .................................. 119/14.01
(58) Field of Classification Search ................ 345/835
See application file for complete search history.

(56) References Cited

U.S. PATENT DOCUMENTS

| | | | |
|---|---|---|---|
| 5,198,976 A | | 3/1993 | Form et al. |
| 5,321,800 A | * | 6/1994 | Lesser .......................... 345/440 |
| 5,355,439 A | | 10/1994 | Bernstein et al. |
| 5,704,311 A | * | 1/1998 | van den Berg .......... 119/14.02 |
| 5,794,178 A | * | 8/1998 | Caid et al. ...................... 704/9 |
| 5,897,619 A | * | 4/1999 | Hargrove et al. ............... 705/4 |
| 5,996,529 A | * | 12/1999 | Sissom et al. ............ 119/14.14 |
| 2002/0069156 A1 | * | 6/2002 | Adam et al. ................... 705/37 |

FOREIGN PATENT DOCUMENTS

EP 0440313 6/1989

* cited by examiner

*Primary Examiner*—Thomas Price
(74) *Attorney, Agent, or Firm*—Hovey Williams LLP

(57) ABSTRACT

A graphical user interface for the monitoring and/or controlling of a computer controlled dairy farm system, or part thereof, by a human user, is disclosed, which includes a computer based graphical and schematic representation of the dairy farm system, or part thereof, where the representation includes objects, each of which represents a respective part of the dairy farm system, or part thereof, and having at least one associated physical property, wherein the physical property associated with the respective object is included among physical properties of the respective represented part of the dairy farm system, or part thereof. Each physical property which is included among the properties of the respective represented part of the dairy farm system, or part thereof, is preferably chosen from the group of spatial location, size, shape, color, direction, movement, amount, rate, frequency and distance from other objects.

14 Claims, 2 Drawing Sheets

GRAPHICAL USER INTERFACE AND METHOD RELATED THERETO

TECHNICAL FIELD OF THE INVENTION

The present invention generally relates to dairy farming and particularly to a graphical user interface, and a method related thereto, for enabling a human user to monitor and/or control a computer controlled dairy farm activity such as for instance automated or semi-automated machine milking.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield, reduced milking time, while still maintaining good udder health. Other activities include feeding, breeding, cleaning and other treatments.

A major trend in this respect is an increased degree of automation of the various activities. For instance, machine milking may be performed by controlling milking robots, more or less manually, or it may even be performed completely automated. In both cases, at least some of monitoring, controlling, regulating, maintaining, trouble shooting, etc., of the milking machine or robot, by a user or operator of the machine, is needed whereby communication between the user and the machine is realized through an input/output means, e.g. a computer screen and a keyboard, a so-called pointing screen, or through more conventional controls such as levers and knobs, of the machine. Very few considerations in respect of designing these controls, and particularly those represented on computer screens, have been taken, which have resulted in poor, often complex, designs. Computer screens often display the information in plain text and various actions are typically performed by pressing a number, often arbitrary chosen, followed by pressing a "return" button or the like.

A problem in this respect, particularly in relation to advanced complex monitoring and controlling associated with computer controlled communication, but also concerning simpler conventional controls, is that it might be a hazardous task for the user not to make any mistakes in the communication with the machine or when interpreting received information, which in turn may lead to fatal errors in the operation of the machine. The more complex the control means is and the shorter time the human user has available, the higher is the probability for the user to perceive information erroneously and/or perform erroneous actions.

In a dairy farm system, there are some particular concerns that have to be dealt with. Firstly, a dairy farm comprises a particular environment in that it includes living animals. In such an unpredictable or uncontrollable environment emergency situations may arise such as animals getting jammed in a gate or teats getting caught in a teat cup etc. In such circumstances, an activity such as opening a gate or detaching a teat cup is needed to be performed extremely rapidly. The user of the dairy farm system, being under stress, thus performs an action, i.e. the first action that comes to the user's mind which is intuitively believed to be the right action. The risk of faulty actions is in this respect considerable high.

Secondly, the problems are probable to arise for a user which is not familiar with the system such as a substitute or the like or for a user confronting a part of the system which normally is not used, e.g. a part used for infrequent operation and maintenance activities, or the like.

Consequently, in an automated dairy farm there is an urgent need of a graphical user interface for controlling various activities, which is easy to understand, logical and enables a user to perform an action in an intuitive manner.

SUMMARY OF THE INVENTION

Accordingly, it is an object of the present invention to provide a graphical user interface in a computer controlled dairy farm system such as a machine milking facility, for monitoring and/or controlling said system. Said graphical user interface should be arranged so as to minimize the cognitive burden that the user is exposed to during use of, e.g. communication with, the system, in order to hereby minimize the risk of erroneous actions.

In this respect, it is a further object of the invention to be integratable in existing computer controlled dairy farm systems.

It is yet a further object to provide such an inventive interface for effective, accurate, precise and reliable use of said system.

These objects among others are, according to one aspect of the invention, fulfilled by a graphical user interface having a computer based graphical and schematic representation of a dairy farm system, or a part thereof, where the representation includes objects, each of which represents a respective part of the dairy farm system, or part thereof, and each object has at least one associated physical property included from among the physical properties of the represented part of the dairy farm system or part thereof.

A further object of the present invention is to provide a method for displaying a graphical user interface in a computer controlled dairy farm system, or part thereof, for communication from the system to a human user and/or from the user to the system.

Consequently, there is according to a second aspect of the present invention provided a method for providing a graphical user interface for monitoring and/or controlling of a computer controlled dairy farm system or part thereof, by a human user, the method including displaying a computer based graphical and schematic representation of the dairy farm system or part thereof, where the representative includes objects, each of which represents a respective part of the dairy farm system, or part thereof, and each object has at least one associated physical property, each at least one physical property associated with the respective object is included from among physical properties associated with the respective object is included from among physical properties of the respective represented part of the dairy farm system, or part thereof.

An advantage of the present invention is that it provides for a reliable operation of the computer controlled dairy farm system.

Further characteristics of the invention, and advantages thereof, will be evident from the following detailed description of embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS.

1–3 which are given by way of illustration only, and thus are not limitative of the invention.

DETAILED DESCRIPTION OF EMBODIMENTS

Figure 1:
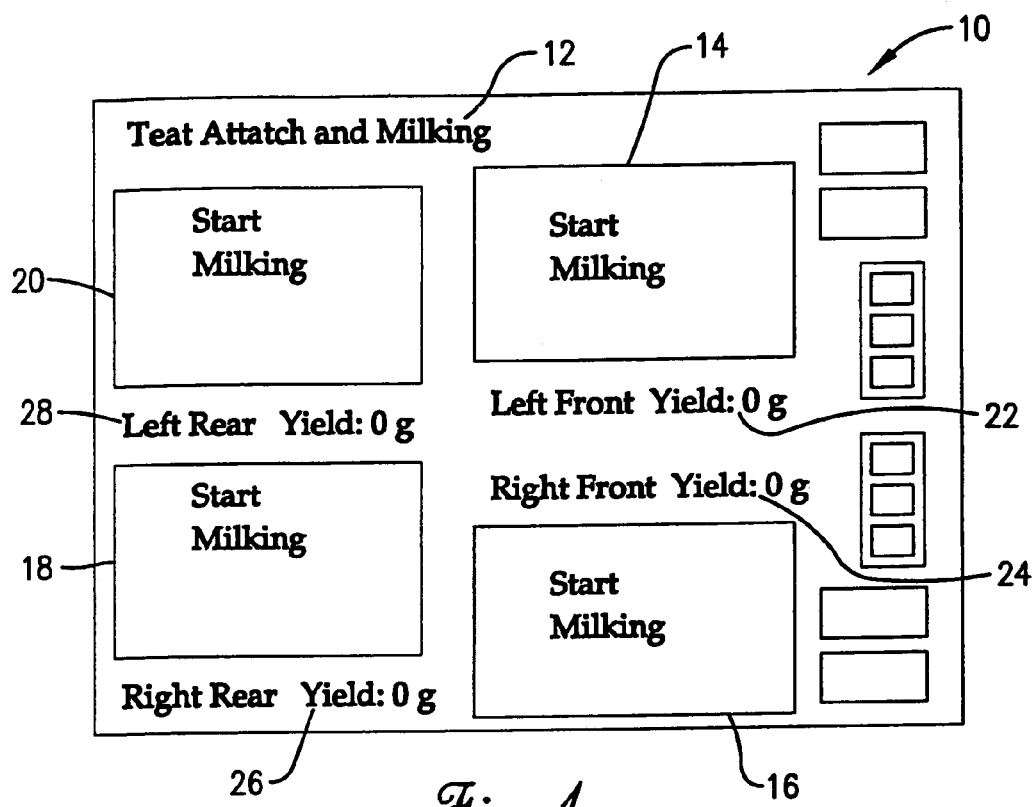
FIG. 1 displays schematically a graphical user interface according to a first embodiment of the present invention.

In the following description, for purposes of explanation and not limitation, specific details are set forth, such as particular hardware, applications, techniques, etc. in order to provide a thorough understanding of the present invention. However, it will be apparent to one skilled in the art that the present invention may be practiced in other embodiments that depart from these specific details. In other instances, detailed descriptions of well-known methods, protocols, apparatuses, and circuits are omitted so as not to obscure the description of the present invention with unnecessary details.

While the present invention is to be employed for communication between a human user and an arbitrary computerized dairy farm system, it will mainly be described in relation to a milking machine system, which typically involves, for each animal milking unit, a clawpiece and a cluster of four teat cups connected to the clawpiece. Each teat cup has a rigid shell and an internal flexible liner. This liner has a topmost mouthpiece and a body part inside the shell body. The liner extends through the bottom of the shell body as a short milk tube. This tube is connected to clawpiece and thence, by way of a long milk tube, to a source of steady vacuum. An annular space, between the teat cup shell and the teat cup liner, is connected to the clawpiece by a pulse tube and thence to a source of pulsating vacuum. A milk meter may be attached to the downstream end of the long milk tube.

Alternatively, the clawpiece and the cluster may be dispensed with, whereby each teat cup is connected directly to a respective long milk tube, and each long milk tube is connected to the vacuum source.

For milking, the four teat cups are placed around the animal's teats, the liner mouthpiece of each teat cup being fitted over the respective teat. The teat cups are held in position during the milking by adhesion, due to the steady vacuum applied for the milking. The pulsating vacuum applied between the teat cup liner and shell causes the liner body to dilate and contract again, thus promoting the flow of milk by simulating suckling. After completion of the milking, the teat cup cluster is removed from the animal's teats, either manually or by automatic means.

The present invention comprises a design of a graphical user interface and interactions through said interface that employs the principle of natural mapping.

Mapping is a technical term, which refers the relation between two things; in the present case the graphical user interface and the automated dairy farm system, e.g. the milking machine. Natural mapping means that this relation should be natural, logic and simple. If a correct natural mapping is employed, there is no need for diagrams, labels or wordy instructions, see e.g. D. A. Norman in The Psychology of Everyday Things, Basic Books.

Thus, the present invention comprises a graphical user interface for monitoring and/or controlling of a computer controlled dairy farm system by a human user comprising a computer based graphical and schematic representation of said system, of a machine or part of a machine thereof, of a fence or a gate thereof, or of an animal, or part thereof, at the dairy farm, featuring that said representation is employing the principle of natural mapping.

In this respect said graphical and schematic representation comprises objects, each of which represents a respective part of said dairy farm system, or part thereof, and each having at least one associated physical property, wherein each said at least one physical property associated with the respective object is comprised among physical properties of the respective represented part of said dairy farm system, or part thereof.

Furthermore, each said at least one physical property which is comprised among the properties of the respective represented part of said dairy farm system, or part thereof, is preferably chosen from the group of spatial location, size, shape, color, direction, movement, amount, rate, frequency and distance from other objects.

Alternatively, a relation between a first and a second object of said representation is comprised among relations between a first and a second part of the dairy farm system, or part thereof, which are represented by said parts.

A few embodiments of the present invention will now be described in relation to a milking robot installation. They constitute different graphical user interfaces, or screen windows that all represent the robot, part thereof or gates used for the milking activities, and/or the cow, or part thereof, in a graphical manner that eliminate, or at least reduce the probability of faulty conception by the user, by the employment of natural mappings.

A first embodiment of the present invention will now be described with reference to FIG. 1, which schematically illustrates a graphical user interface 10 used for e.g. monitoring or controlling of a milking machine of the above depicted type during a particular phase of the milking denoted "Teat attach and Milking"12. Here, the four teats of the cow are represented graphically by four boxes, 14, 16, 18, 20, labeled "Start Milking", located relative each other as they do in reality, i.e. with a larger distance between the front teats than between the back teats. This is a fact well known to every single farmer, and hence the risk for making a mistake while identifying the teats for further handling such as milking, is minimized. When viewing the interface and the milking machine, respectively, from the same position, the cow and the graphical teat representation should preferably have their fronts facing towards the same direction, i.e. towards the right in the illustrated case. But in either case, the risk of making a mistake is severely reduced.

Furthermore, each teat representation has a respective status indication 22,24,26.28 associated therewith, which indicates whether the teat is being milked or not. In FIG. 1 the representations show "Start milking" and the teats are thus not being milked. By activating the milking manually, e.g. by pressing the "Start milking" buttons, or whether it is performed automatically, the representations are starting to indicate the milk mass flow in real time. Next to each representation, there is a status indication of the milk yield (in grams), i.e. accumulated collected milk, from the respective teat during the milking.

The labels "left rear", "left front", "right rear" and "right front" are redundant information and may be removed, whereby only the naturally mapped graphical representation of the teat formation is sufficient for identifying the respective teat. This is an example of a simple but excellent natural mapping.

Figure 2:
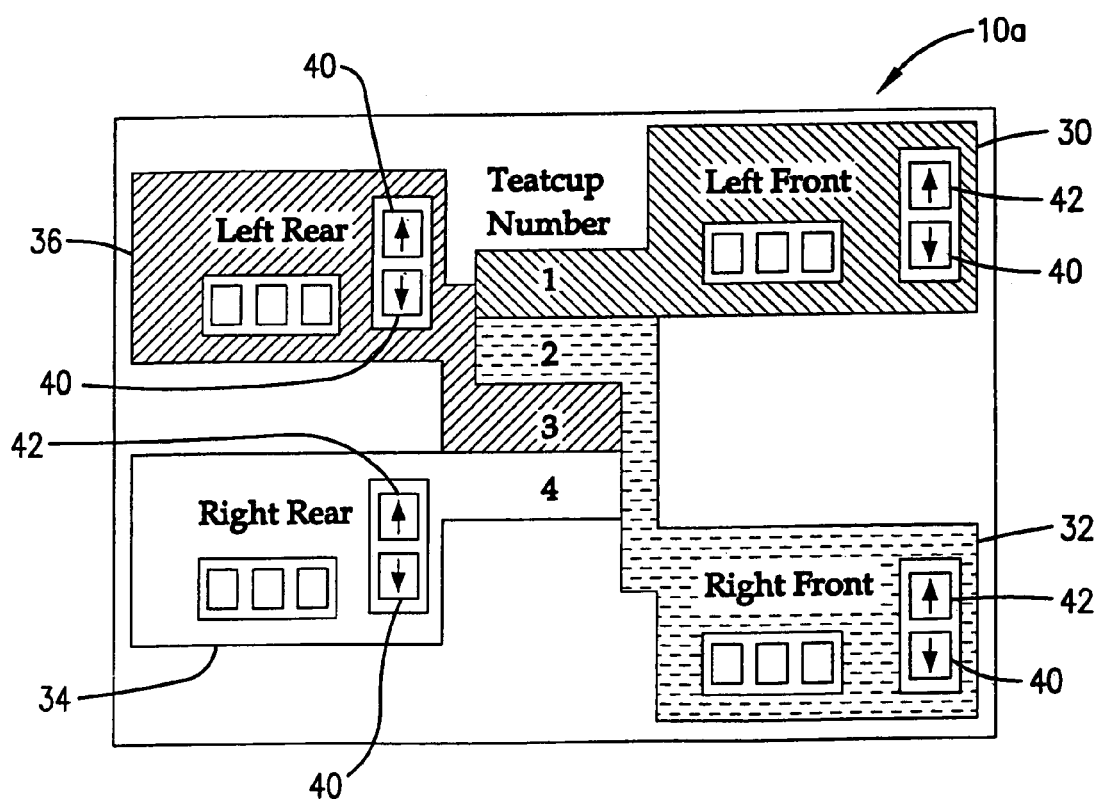
FIG. 2 illustrates schematically a graphical user interface according to a second embodiment of the present invention.

Considering next FIG. 2 which illustrates a graphical user interface 10*a* according a second embodiment of the present invention corresponding to an adjustment phase, i.e. for teat cup testing of the milking machine. At this stage, the teat cups are located along a line in a magazine at one side of the milking machine. The interface has graphical representations 30,32,34,36 of the teat cups in this location and the coupling between the respective positions, i.e. in its magazine and attached to teat, is shown by color-coding of the respective representations. Thus, there is a mapping between the teat cup in its magazine position and in its position during milking.

Alternatively, the coupling may be indicated by arrows 40,42 or movement directions for how a respective teat cup is moved during teat attachment and detachment, which may be activated automatically or by the user, e.g. by clicking, double clicking or movement through the so-called drag-and-drop technique of the respective graphical representation.

Figure 3:
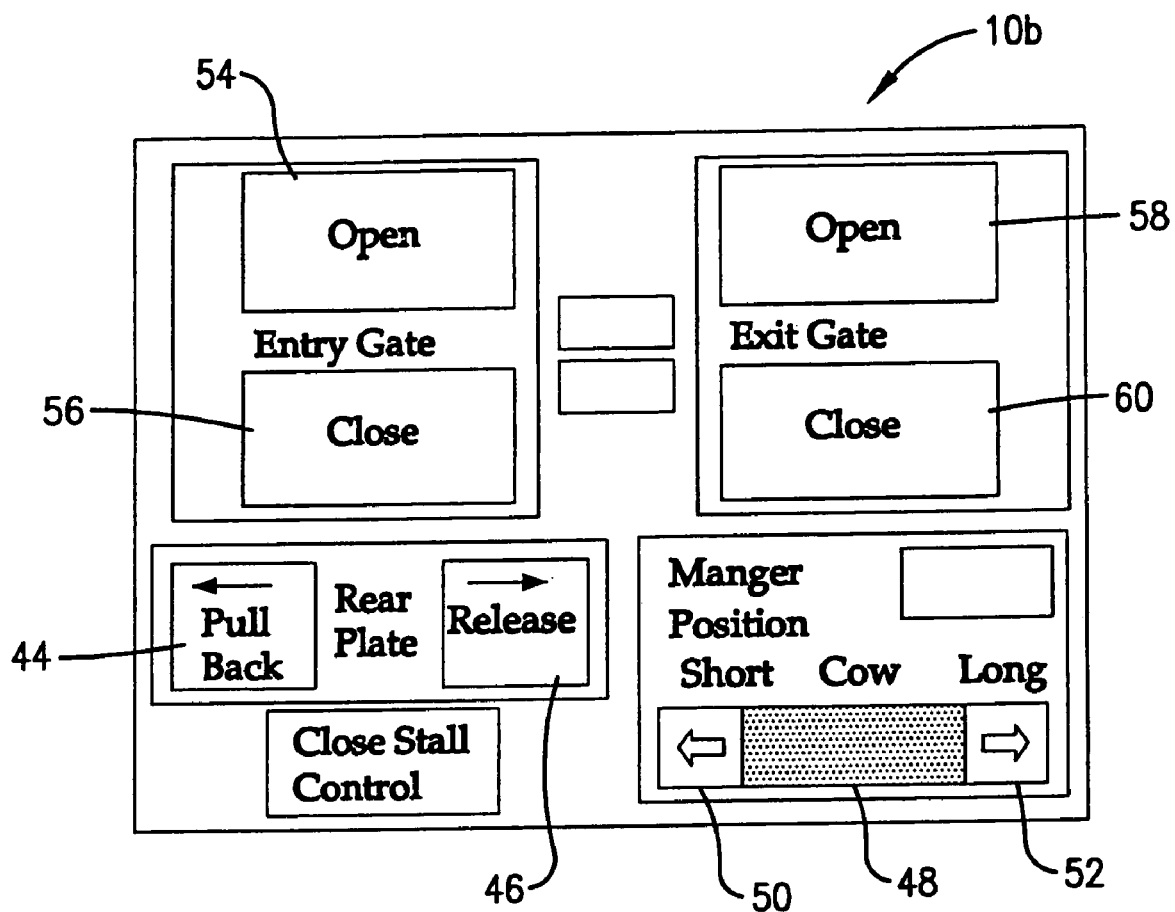
FIG. 3 illustrates schematically a graphical user interface according to a third embodiment of the present invention.

Considering next FIG. 3 which illustrates a graphical user interface 10b according a third embodiment of the present invention corresponding to another adjustment phase of the milking machine, i.e. a stall control, for adjusting of manger position, a rear plate, and entry and exit gates, respectively.

Here, the rear plate, i.e. a plate for collecting cow excrements, may be in either of two positions; in a "Pull Back" position wherein it is out of use and removed from the stall enabling the cow to enter the stall from left, i.e. through an entry gate, or in a "Release" position wherein it is positioned behind the cow, when the cow is in the stall, for collecting of excrements. The plate is moved as indicated by the arrows 44,46, i.e. to the left when it is pulled back and to the right when it is released. The position of the manger is utilized for adjustment of the stall length to each individual cow. This is performed by variably position the manger; more to the left for shorter cows and more to the right for longer cows, as indicated by the scroll bar 48 (and the arrows 50,52 in the Figure). Finally, the entry and exit gates have push buttons 54,56,58, and 60 for opening and closing. The gates are preferably opened from the far side of the user and closed from the close side, as indicated by the positions of the respective push buttons in the Figure.

Furthermore, the respective positions of the rear plate, the manger and the gates correspond to their positions in reality, i.e. with the rear plate and the entry gate to the left and the manger and the exit gate to the right (from the user's intended viewpoint).

A fourth embodiment of the present invention (not shown in the Figures) comprises a graphical user interface that shows an entire dairy farm in a perspicuous manner, with position indications for each individual cow, fence, gate and apparatus, and status indications such as if cows have been milked or not, if gates are opened or closed, and if apparatuses are in use or not.

Other machines or processes at a dairy farm may off course be equally suited for the implementation of a computer controlled, controlling and/or informing graphical user interface that makes use of the invention by employing natural mappings.

In summary several embodiments of the present invention have been disclosed, which illustrate the various characteristics of the present invention.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A graphical user interface provided for the monitoring and/or controlling of a milking machine by a human user, said graphical user interface comprising at least one computer based graphical and schematic representation selected from the group consisting of a representation of at least a part of the milking machine and a representation of a cow present at the milking machine, wherein said one representation comprises objects, each of which represents an element of said at least part of the milking machine or of the cow present at the milking machine, and each of which having a spatial location in relation to the other object(s), which corresponds to the spatial location of the represented element in relation to the other element(s) of said at least part of the milking machine or of a cow present at the milking machine.

2. The graphical user interface as claimed in claim 1, wherein each of said objects has at least one physical property which is characteristic for the element the object represents,
   each said at least one physical property is chosen from the group consisting of size, shape, color, direction, movement, amount, rate, and frequency.

3. The graphical user interface as claim in claim 1, wherein said graphical user interface comprises objects representing the teats of a cow, or teat cups that are attached to them, by four icons located schematically with a longer distance between the icons representing the front teats or teat cups and a shorter distance between the icons representing the back teats or teats cups.

4. The graphical user interface as claimed in claim 3, wherein said objects representing the teats of a cow or teat cups that are attached to them, are associated with respective controls for starting milking or with respective status indications indicating milk yield during milking.

5. The graphical user interface as claimed in claim 3, wherein said graphical user interface comprises objects representing the teat cups as detached at spatial locations, which schematically correspond to the respective spatial locations in the milking machine.

6. The graphical user interface as claimed in claim 5, wherein each of the objects representing the teats of a cow, or teat cups that are attached to them, has a visual characteristic in common with the object representing the teat cup as detached.

7. The graphical user interface as claimed in claim 1, wherein said graphical user interface comprises objects representing an entry gate and of an exit gate, respectively, of said milking machine, at spatial locations corresponding schematically to the respective locations of the entry gate and the exit gate in the milking machine.

8. The graphical user interface as claimed in claim 7, wherein the objects representing the entry gate and of the exit gate are associated with respective controls for opening and closing the entry gate and the exit gate or with respective status indications indicating whether the entry gate and the exit gate are opened or closed.

9. The graphical user interface as claimed in claim 3, wherein said graphical user interface comprises objects representing a rear plate and a manger, respectively, of said milking machine.

10. The graphical user interface as claimed in claim 9, wherein the objects representing the rear plate and the manger are associated with respective controls for positioning the rear plate and the manger or with respective status indications indicating the location of the rear plate and the manger.

11. An automatic milking machine comprising a graphical user interface as claimed in claim 1.

12. A method for providing a graphical user interface for the monitoring and/or controlling of a milking machine by a human user, comprising the step of:

displaying at least one computer based graphical and schematic representation selected from the group consisting of a representation of at least a part of the milking machine and a representation of a cow present at the milking machine, wherein said representation comprises objects, each of which represents an element of said at least part of the milking machine or of the cow present at the milking machine, and each of which having a spatial location in relation to the other object(s), which corresponds to the spatial location of the represented element in relation to the other element(s) of said at least part of the milking machine or of a cow present at the milking machine.

13. The method as claimed in claim 12, wherein each of said objects has at least one physical property, which is characteristic for the element the object represents, wherein each said at least one physical property being chosen from the group of size, shape, color, direction, movement, amount, rate, and frequency.

14. The method as claimed in claim 12, wherein said computer based graphical and schematic representation comprises objects representing the teats of a cow, or teat cups that are attached to them by four icons located schematically with a longer distance between the icons representing the front teats or teat cups and a shorter distance between the icons representing the back teats or teat cups.

* * * * *